United States Patent
Nagashima et al.

(10) Patent No.: US 11,022,512 B2
(45) Date of Patent: Jun. 1, 2021

(54) MEASUREMENT SYSTEM, MEASUREMENT METHOD, AND PRESSURE MEASUREMENT APPARATUS

(71) Applicants: YOKOGAWA ELECTRIC CORPORATION, Musashino (JP); Yokogawa Test & Measurement Corporation, Musashino (JP)

(72) Inventors: Hirokazu Nagashima, Musashino (JP); Tadahiko Iinuma, Musashino (JP); Hironori Kurihara, Musashino (JP); Hideki Yamada, Musashino (JP)

(73) Assignees: YOKOGAWA ELECTRIC CORPORATION, Musashino (JP); Yokogawa Test & Measurement Corporation, Musashino (JP)

( * ) Notice: Subject to any disclaimer, the term of this patent is extended or adjusted under 35 U.S.C. 154(b) by 143 days.

(21) Appl. No.: 16/410,201

(22) Filed: May 13, 2019

(65) Prior Publication Data
US 2019/0346325 A1    Nov. 14, 2019

(30) Foreign Application Priority Data
May 14, 2018    (JP) ............................... JP2018-093291

(51) Int. Cl.
*G01L 19/08*    (2006.01)
(52) U.S. Cl.
CPC .................. *G01L 19/083* (2013.01)
(58) Field of Classification Search
CPC ....................................... G01L 19/083
USPC ......................................... 73/700
See application file for complete search history.

(56) References Cited

U.S. PATENT DOCUMENTS

| | | | | |
|---|---|---|---|---|
| 7,878,074 B1* | 2/2011 | Shapiro | ................... | G01F 1/383 73/861.61 |
| 9,016,133 B2* | 4/2015 | Besling | ................. | G01L 9/0047 73/718 |
| 2004/0015282 A1* | 1/2004 | Babala | .................... | B60T 8/368 701/70 |
| 2004/0254748 A1 | 12/2004 | Kopp | | |
| 2007/0209442 A1* | 9/2007 | Takahashi | ................. | G01F 1/36 73/714 |
| 2011/0320158 A1* | 12/2011 | Steckenreiter | ........... | G01D 3/08 702/104 |
| 2014/0060209 A1* | 3/2014 | Broillet | ................... | G01P 15/09 73/862.68 |
| 2014/0223988 A1* | 8/2014 | Kajikawa | .............. | G01L 27/005 73/1.69 |

(Continued)

FOREIGN PATENT DOCUMENTS

| | | |
|---|---|---|
| CN | 1743822 A | 3/2006 |
| CN | 104038333 A | 9/2014 |

(Continued)

OTHER PUBLICATIONS

Solinst Canada Ltd., Levelogger Series, User Guide—Software Version 3.4.0, Aug. 11, 2009.

*Primary Examiner* — Eric Blount
(74) *Attorney, Agent, or Firm* — Kenja IP Law PC

(57) ABSTRACT

A measurement system (20) includes pressure measurement apparatuses (220, 221, 222) capable of measuring pressure. The pressure measurement apparatuses (220, 221, 222) measure pressure at a measurement timing designated by a trigger signal.

5 Claims, 14 Drawing Sheets

(56) References Cited

U.S. PATENT DOCUMENTS

2014/0257729 A1  9/2014  Wolf et al.

FOREIGN PATENT DOCUMENTS

| JP | S6017317 A | 1/1985 |
|---|---|---|
| JP | H1082803 A | 3/1998 |
| JP | 2002296137 A | 10/2002 |
| JP | 2003194648 A | 7/2003 |
| JP | 2005164406 A | 6/2005 |
| JP | 2007240498 A | 9/2007 |
| JP | 2009222400 A | 10/2009 |
| JP | 2010085326 A | 4/2010 |
| JP | 2011081548 A | 4/2011 |
| JP | 2014174168 A | 9/2014 |
| JP | 2016180650 A | 10/2016 |
| JP | 2017516183 A | 6/2017 |
| WO | 2013042607 A1 | 3/2013 |
| WO | 2015138085 A1 | 9/2015 |

\* cited by examiner

MEASUREMENT SYSTEM, MEASUREMENT METHOD, AND PRESSURE MEASUREMENT APPARATUS

CROSS-REFERENCE TO RELATED APPLICATION

The present application claims priority to and the benefit of Japanese Patent Application No. 2018-093291 filed May 14, 2018, the entire contents of which are incorporated herein by reference.

TECHNICAL FIELD

The present disclosure relates to a measurement system, a measurement method, and a pressure measurement apparatus for measuring pressure.

BACKGROUND

Pressure measurement apparatuses that measures pressure on the basis of output from a pressure sensor are known. For example, see patent literature (PTL) 1.

CITATION LIST

Patent Literature

PTL 1: JP2005-164406A

SUMMARY

A measurement system according to an embodiment includes a plurality of pressure measurement apparatuses capable of measuring pressure. The plurality of pressure measurement apparatuses measure pressure at a measurement timing designated by a trigger signal.

A measurement method according to an embodiment is executed by a measurement system including a plurality of pressure measurement apparatuses capable of measuring pressure. The measurement method includes receiving, using the plurality of pressure measurement apparatuses, a trigger signal designating a measurement timing and measuring pressure, using the plurality of pressure measurement apparatuses, at the measurement timing designated by the trigger signal.

A pressure measurement apparatus according to an embodiment includes a trigger input switching unit configured to switch an input source of a trigger signal that designates a measurement timing between an internal trigger generator and an external apparatus, and a controller configured to execute pressure measurement processing at the measurement timing designated by the trigger signal.

DETAILED DESCRIPTION

Figure 1:
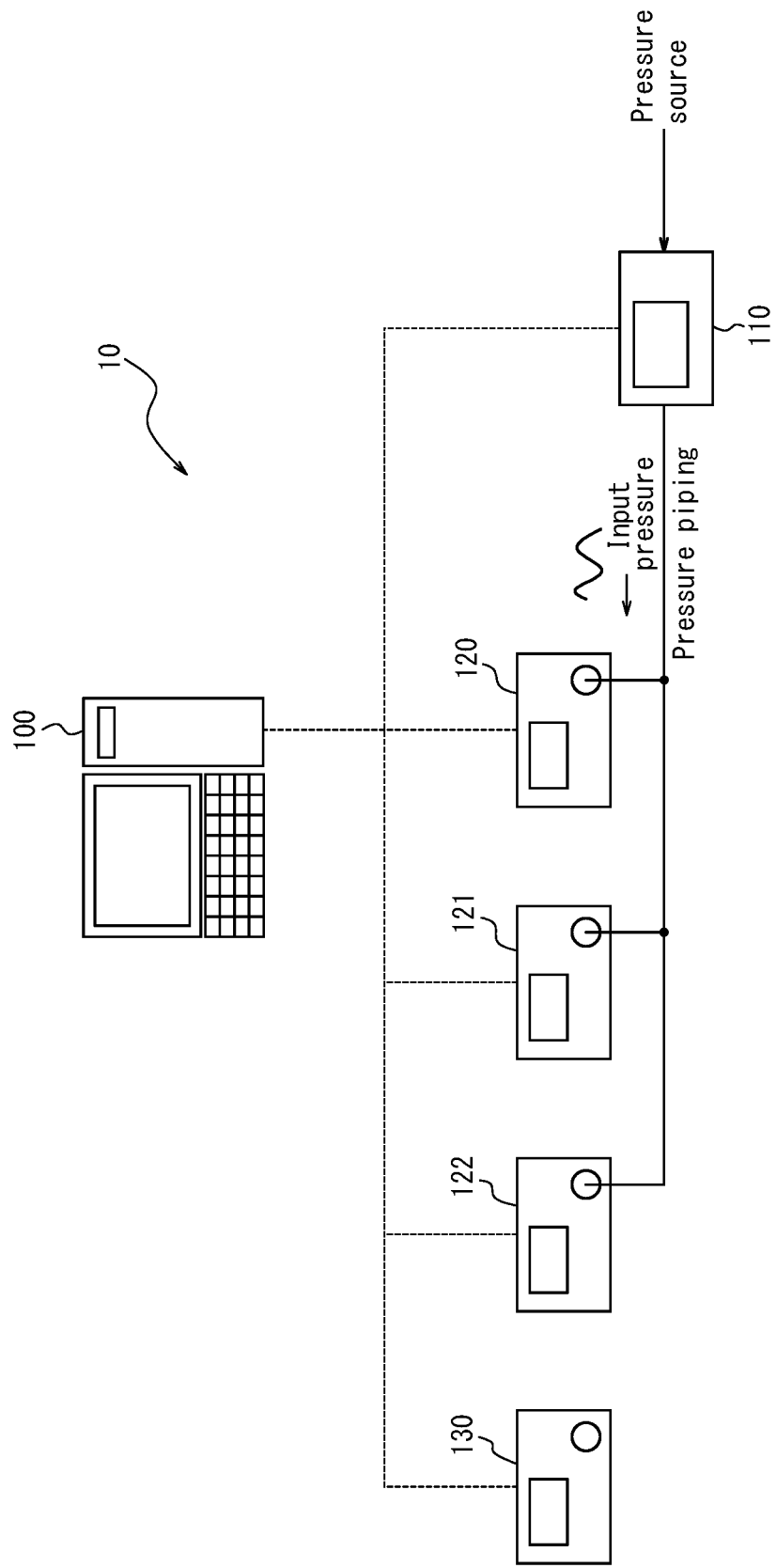
FIG. 1 is a schematic diagram illustrating an example measurement system.

Inspection, to confirm the state of the pressure measurement apparatus, and calibration may be performed. The inspection and calibration are, for example, performed on a plurality of pressure measurement apparatuses using one pressure measurement apparatus as a reference.

It is an objective of the present disclosure to provide a measurement system, a measurement method, and a pressure measurement apparatus that can perform inspection or calibration more accurately.

A measurement system according to an embodiment includes a plurality of pressure measurement apparatuses capable of measuring pressure. The plurality of pressure measurement apparatuses measure pressure at a measurement timing designated by a trigger signal. In this way, the measurement timing of the plurality of pressure measurement apparatuses can be synchronized by the plurality of pressure measurement apparatuses measuring pressure at the timing designated by the trigger signal. The results of pressure measurement by the plurality of pressure measurement apparatuses are therefore less susceptible to the effect of a difference in the pressure of a fluid depending on the timing of pressure measurement. Consequently, inspection or calibration can be performed more accurately.

In an embodiment, the trigger signal may be generated by one pressure measurement apparatus among the plurality of pressure measurement apparatuses. By having one of the pressure measurement apparatuses included in the measurement system generate the trigger signal in this way, the measurement system can synchronize the measurement timing without using an external apparatus as the supply source of the trigger signal.

In an embodiment, the trigger signal may be transmitted to the plurality of pressure measurement apparatuses from an external apparatus. Such supply of the trigger signal from an external apparatus allows the measurement timing to be synchronized without placing the load for processing to generate the trigger signal on the plurality of pressure measurement apparatuses.

In an embodiment, each measurement apparatus in the plurality of pressure measurement apparatuses may include a trigger input switching unit configured to switch an input source of the trigger signal between an internal trigger generator and an external apparatus. When the pressure measurement apparatuses include the trigger input switching unit in this way, the input source of the trigger signal can be switched easily by switching within the trigger input switching unit.

In an embodiment, the plurality of pressure measurement apparatuses may be connected in a daisy chain. The trigger signal is transmitted sequentially to the plurality of pressure measurement apparatuses when the plurality of pressure measurement apparatuses are connected in a daisy chain in this way.

A measurement method according to an embodiment is executed by a measurement system including a plurality of pressure measurement apparatuses capable of measuring pressure. The measurement method includes receiving, using the plurality of pressure measurement apparatuses, a trigger signal designating a measurement timing and measuring pressure, using the plurality of pressure measurement apparatuses, at the measurement timing designated by the trigger signal. In this way, the measurement timing of the plurality of pressure measurement apparatuses can be synchronized by the plurality of pressure measurement apparatuses measuring pressure at the timing designated by the trigger signal. The results of pressure measurement by the plurality of pressure measurement apparatuses are therefore less susceptible to the effect of a difference in the pressure of a fluid depending on the timing of pressure measurement. Consequently, inspection or calibration can be performed more accurately.

A pressure measurement apparatus according to an embodiment includes a trigger input switching unit configured to switch an input source of a trigger signal that designates a measurement timing between an internal trigger generator and an external apparatus, and a controller configured to execute pressure measurement processing at the measurement timing designated by the trigger signal. When the pressure measurement apparatuses include a trigger input switching unit in this way, the input source of the trigger signal can be switched easily by switching within the trigger input switching unit. When the pressure measurement apparatus is connected to another pressure measurement apparatus, the measurement timing of a plurality of pressure measurement apparatuses can thus be synchronized by transmission and reception of a trigger signal and measurement of pressure at the timing designated by the trigger signal. The results of pressure measurement by the plurality of pressure measurement apparatuses are therefore less susceptible to the effect of a difference in the pressure of a fluid depending on the timing of pressure measurement. Consequently, inspection or calibration can be performed more accurately.

The present disclosure can provide a measurement system, a measurement method, and a pressure measurement apparatus that can perform inspection or calibration more accurately.

Embodiments of the present disclosure are now described with reference to the drawings.

FIG. 1 is a schematic diagram illustrating an example measurement system. The measurement system 10 in FIG. 1 includes a control apparatus 100, a pressure control apparatus 110, three pressure measurement apparatuses 120, 121 and 122, and an atmospheric pressure gauge 130. In the measurement system 10 illustrated in FIG. 1, pressure is measured by the three pressure measurement apparatuses 120, 121 and 122. Inspection, calibration, and the like of the pressure measurement apparatus 120, 121 or 122 are performed by comparing the results of pressure measurement by these three pressure measurement apparatuses 120, 121 and 122.

In the example in FIG. 1, the pressure measurement apparatus 120 is a reference device used as a reference for inspection or calibration, and the other pressure measurement apparatuses 121 and 122 are apparatuses to be inspected or calibrated. In other words, inspection or calibration of the pressure measurement apparatuses 121 and 122 is performed with the pressure measurement apparatus 120 as a reference in the measurement system 10 illustrated in FIG. 1. In the present disclosure, the pressure measurement apparatus used as a reference for inspection or calibration is referred to as a "reference device", and the pressure measurement apparatus to be inspected or calibrated is referred to as a "device under test". When distinguishing between the two devices under test in the measurement system 10, the terms "first device under test 121" and "second device under test 122" are used. The three pressure measurement apparatuses 120, 121 and 122 may, for example, be configured as pressure transmitters, differential pressure transmitters, or the like.

In the measurement system 10, pressure piping is connected to the reference device 120 and the devices under test 121 and 122, as indicated by the solid lines in FIG. 1. A fluid, such as a gas, is supplied to the pressure piping. The fluid supplied to the pressure piping is, for example, controlled by the pressure control apparatus 110 on the basis of the control signal from the control apparatus 100. When inspection or calibration is performed in the measurement system 10, the reference device 120 and the devices under test 121 and 122 each measure the pressure of the fluid supplied to the pressure piping. The inspection or calibration is performed by comparing the results of pressure measurement performed by the reference device 120 and the devices under test 121 and 122. Here, an example of the measurement system 10 including two devices under test 121 and 122 is described, but the number of devices under test need not be two. The measurement system 10 may, for example, include one device under test or three or more devices under test.

The control apparatus 100 controls and manages the overall inspection and calibration processing in the measurement system 10. The control apparatus 100 may, for example, be configured as a computer. As indicated by the dashed lines in FIG. 1, for example, the control apparatus 100 is communicably connected to each of the pressure control apparatus 110, reference device 120, devices under test 121 and 122, and atmospheric pressure gauge 130. The control apparatus 100 can acquire data and transmit control signals by transmitting and receiving signals to and from each of the communicably connected pressure control apparatus 110, reference device 120, devices under test 121 and 122, and atmospheric pressure gauge 130.

The pressure control apparatus 110 controls the fluid supplied to the pressure piping. The pressure control apparatus 110 may, for example, be configured as a pressure controller, a dead weight pressure balance, or the like. For example, when the pressure measurement apparatuses 120, 121 and 122 are configured as pressure transmitters, and a 1 kPa range is to be detected to an accuracy of 0.01% or less, a dead weight pressure balance may be used as the pressure control apparatus 110. On the other hand, when the pressure measurement apparatuses 120, 121 and 122 are configured as differential pressure transmitters, and a 1 kPa range is to be detected to an accuracy of 0.1% or less, for example, a pressure controller may be used as the pressure control apparatus 110.

For example, a device that compresses the fluid, such as a compressor, is provided as the pressure source on the upstream side of the pressure control apparatus 110, i.e. the fluid supply side. The pressure control apparatus 110 controls the pressure of the fluid input from the compressor and supplies the fluid to the pressure piping. For example, the pressure control apparatus 110 stabilizes the pressure of a fluid, inputted with unstable pressure from the compressor, and supplies the fluid to the pressure piping.

The measurement system 10 may include a plurality of pressure control apparatuses 110. The pressure control apparatuses 110 may each have a different output pressure range. In this case, one pressure control apparatus 110 may be selected from the plurality of pressure control apparatuses 110 in accordance with factors such as the specifications of the devices under test 121 and 122 to be inspected or calibrated, the conditions of inspection or calibration, and the state of the pressure control apparatus 110. The fluid may then be supplied to the pressure piping using the selected pressure control apparatus 110.

Figure 2:
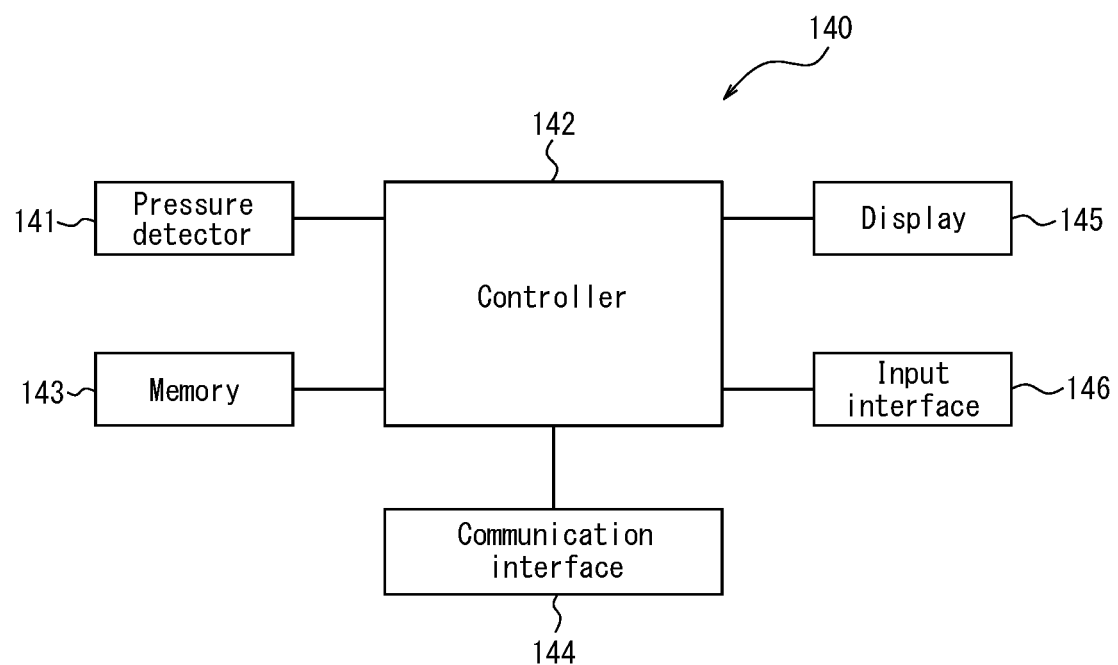
FIG. 2 is a functional block diagram illustrating an example schematic configuration of a pressure measurement apparatus.

The reference device 120 and the devices under test 121 and 122 are configured as pressure measurement apparatuses and measure the gauge pressure. FIG. 2 is a functional block diagram illustrating an example schematic configuration of a pressure measurement apparatus. The reference device 120 and the devices under test 121 and 122 may all be configured as a pressure measurement apparatus 140 illustrated as an example in FIG. 2. The pressure measurement apparatus 140 includes a pressure detector 141, a controller 142, a memory 143, a communication interface 144, a display 145, and an input interface 146.

The pressure detector 141 is a pressure sensor for detecting the pressure of a fluid input to the pressure measurement apparatus 140. The pressure detector 141 generates an electric signal corresponding to the detected pressure and transmits the electric signal to the controller 142. For example, the pressure detector 141 generates the electric signal by using a silicon resonant pressure sensor to convert the pressure to an electric signal of a natural frequency.

The controller 142 controls and manages the pressure measurement apparatus 140 overall, including each of the functional blocks of the pressure measurement apparatus 140. The controller 142 can be configured a suitable processor, such as a central processing unit (CPU), that executes a program with stipulated control procedures, or can be configured as a dedicated processor specialized for each process. Such a program may, for example, be stored in the memory 143 or on an external storage medium or the like connected to the pressure measurement apparatus 140.

The controller 142 calculates the pressure of the fluid supplied to the pressure measurement apparatus 140 on the basis of the electric signal acquired from the pressure detector 141. For example, the controller 142 can count the frequency of the signal outputted from the pressure detector 141 and perform computations set in advance to calculate the pressure. The pressure measured by the pressure measurement apparatus 140 is calculated in this way.

The memory 143 can be configured as a semiconductor memory, a magnetic memory, or the like. The memory 143 stores various information and programs for operating the pressure measurement apparatus 140. The memory 143 may also function as a working memory.

Based on control performed by the controller 142, the communication interface 144 transmits and receives signals to and from an external device. For example, the communication interface 144 transmits a signal for the measured pressure calculated by the controller 142 to the control apparatus 100. The pressure measurement apparatus 140 can transmit the measured pressure to the control apparatus 100 in this way.

The display 145 is a display device configured as a well-known display, such as a liquid crystal display (LCD), an organic electro-luminescence display (OELD), or an inorganic electro-luminescence display (IELD). For example, information regarding the measured pressure calculated by the controller 142 is displayed on the display 145. In other words, the value resulting from measurement of pressure by the reference device 120 and the values resulting from measurement of pressure by the devices under test 121 and 122, for example, are displayed on the display 145.

The input interface 146 receives operation inputs from a user of the pressure measurement apparatus 140 and may be configured as operation buttons (operation keys), for example. The input interface 146 may be configured as a touchscreen and receive touch operation inputs from the user to an input region, displayed on a portion of the display device that is the display 145, for receiving operation input.

The pressure measurement apparatus 140 described with reference to FIG. 2 is only an example. The pressure measurement apparatus 140 need not have the same configuration as the one described here. For example, the pressure measurement apparatus 140 may have a different configuration, or a portion of the configuration illustrated in FIG. 2 may be omitted. The display 145, for example, may be omitted from the pressure measurement apparatus 140. In this case, the pressure measurement apparatus 140 may transmit the result of pressure measurement to the control apparatus 100. The control apparatus 100 may display information related to the transmitted result of the pressure measurement on a display included in the control apparatus 100.

The atmospheric pressure gauge 130 measures the atmospheric pressure. The atmospheric pressure measured by the atmospheric pressure gauge 130 is used as a reference pressure when the measured pressure is calculated in the reference device 120 and the devices under test 121 and 122.

The measurement system 10 may include an absolute pressure gauge along with, or instead of, the atmospheric pressure gauge 130. An absolute pressure gauge measures the absolute pressure. The absolute pressure measured by the absolute pressure gauge may be used as a reference pressure when the measured pressure is calculated in the reference device 120 and the devices under test 121 and 122.

Figure 3:
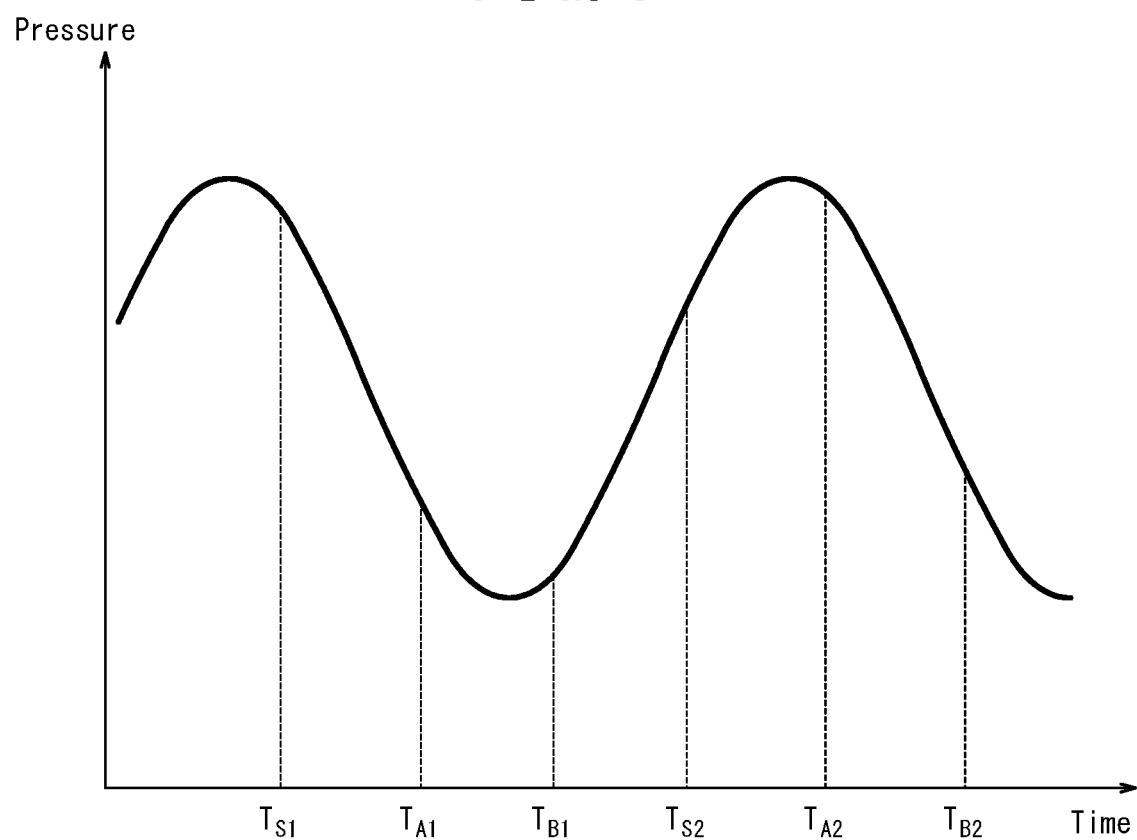
FIG. 3 illustrates an example of inspection or calibration processing using the measurement system of FIG. 1.

FIG. 3 illustrates an example of inspection or calibration processing using the measurement system 10 of FIG. 1. The inspection or calibration processing may, for example, be performed in an environment with controlled air conditioning, referred to as a constant temperature chamber. At the time that pressure is measured, temperature fluctuations in the surrounding environment may affect fluctuations in the input pressure of the fluid supplied to the pressure piping. Use of a constant temperature chamber, however, aids in suppressing fluctuation of the input pressure.

When inspection or calibration processing is performed, the flow rate of the fluid supplied to the pressure piping is controlled by the pressure control apparatus 110, as described above. Nevertheless, it is difficult to maintain a constant pressure continually even with control by the pressure control apparatus 110. In other words, the pressure of the fluid supplied to the piping fluctuates even with control by the pressure control apparatus 110, as schematically illustrated in FIG. 3, for example.

The reference device 120 and the devices under test 121 and 122 each measure the supplied pressure over a predetermined sampling cycle, for example. In the example in FIG. 3, the reference device 120 measures pressure at times $T_{S1}$ and $T_{S2}$, the first device under test 121 measures pressure at times $T_{A1}$ and $T_{A2}$, and the second device under test 122 measures pressure at times $T_{B1}$ and $T_{B2}$, for example. The reference device 120, the first device under test 121, and the second device under test 122 may thus each measure pressure at a different timing. In this case, the pressure of the fluid differs depending on the timing at which the pressure is measured, since the pressure of the fluid fluctuates. Since the pressure of the fluid itself may differ at the different timings at which the pressure is measured, the measured pressure of the fluid may differ depending on the measurement timing. This difference in measured pressure makes it difficult to perform inspection or calibration accurately by comparing the pressure values measured by the reference device 120, the first device under test 121, and the second device under test 122.

To reduce the effect of the difference in the pressure of the fluid depending on the timing at which the pressure is measured, each of the reference device 120, the first device under test 121, and the second device under test 122 may, for example, measure the pressure at a plurality of timings. The average and/or standard deviation of the measured pressures may then be calculated, and the averages and/or standard deviations may be compared to perform inspection or calibration. While use of the average and/or standard deviation of pressure can reduce the effect caused by the difference in the pressure of the fluid depending on the timing at which the pressure is measured, the timing of pressure measurement nevertheless differs, which limits the extent to which the accuracy of inspection or calibration can be improved.

Furthermore, when the measurement system 10 includes a plurality of pressure control apparatuses 110 to ensure a wide pressure range for inspection or calibration, each increase in the number of pressure control apparatuses 110 raises the cost of the measurement system 10.

Another possible method for suppressing fluctuation of pressure is to supply fluid to the pressure piping with the pressure control apparatus 110, subsequently close the valve on the input side (upstream) of the pressure piping to enclose the fluid in the pressure piping, wait for the pressure of the fluid to stabilize inside the pressure piping, and then have the pressure measurement apparatuses 120, 121 and 122 measure the pressure. This method, however, encloses the fluid in the pressure piping and is therefore susceptible to ambient temperature changes. Specifically, the fluid inside the pressure piping expands or contracts when the ambient temperature changes, making the pressure inside the pressure piping susceptible to change with this method. Inspection or calibration therefore needs to be performed in a constant temperature chamber to achieve better accuracy with this method. Use of a constant temperature chamber presupposes the installation costs of the constant temperature chamber.

When the pressure measurement apparatuses 120, 121 and 122 are configured as pressure transmitters and a differential pressure inspection of the pressure transmitters is performed, a differential pressure is generated using two dead weight pressure balances. The inspection can then be performed. Not all operators can easily handle the dead weight pressure balances, however, since their operation requires certain skill. Operation is also time-consuming, which may increase the time required for inspection. Depending on the specifications, some dead weight pressure balances are expensive, which may increase the costs for inspection or calibration.

When the pressure measurement apparatuses 120, 121 and 122 are configured as differential pressure transmitters, inspection or calibration of the differential pressure transmitters needs to be performed in a location without controlled air conditioning. Inspection or calibration is therefore easily affected by fluctuation of the surrounding environment, such as the barometric pressure or temperature, making it difficult to improve the accuracy of inspection or calibration.

The measurement system, measurement method, and pressure measurement apparatus of the present disclosure can perform inspection or calibration more accurately, as described below.

Figure 4:
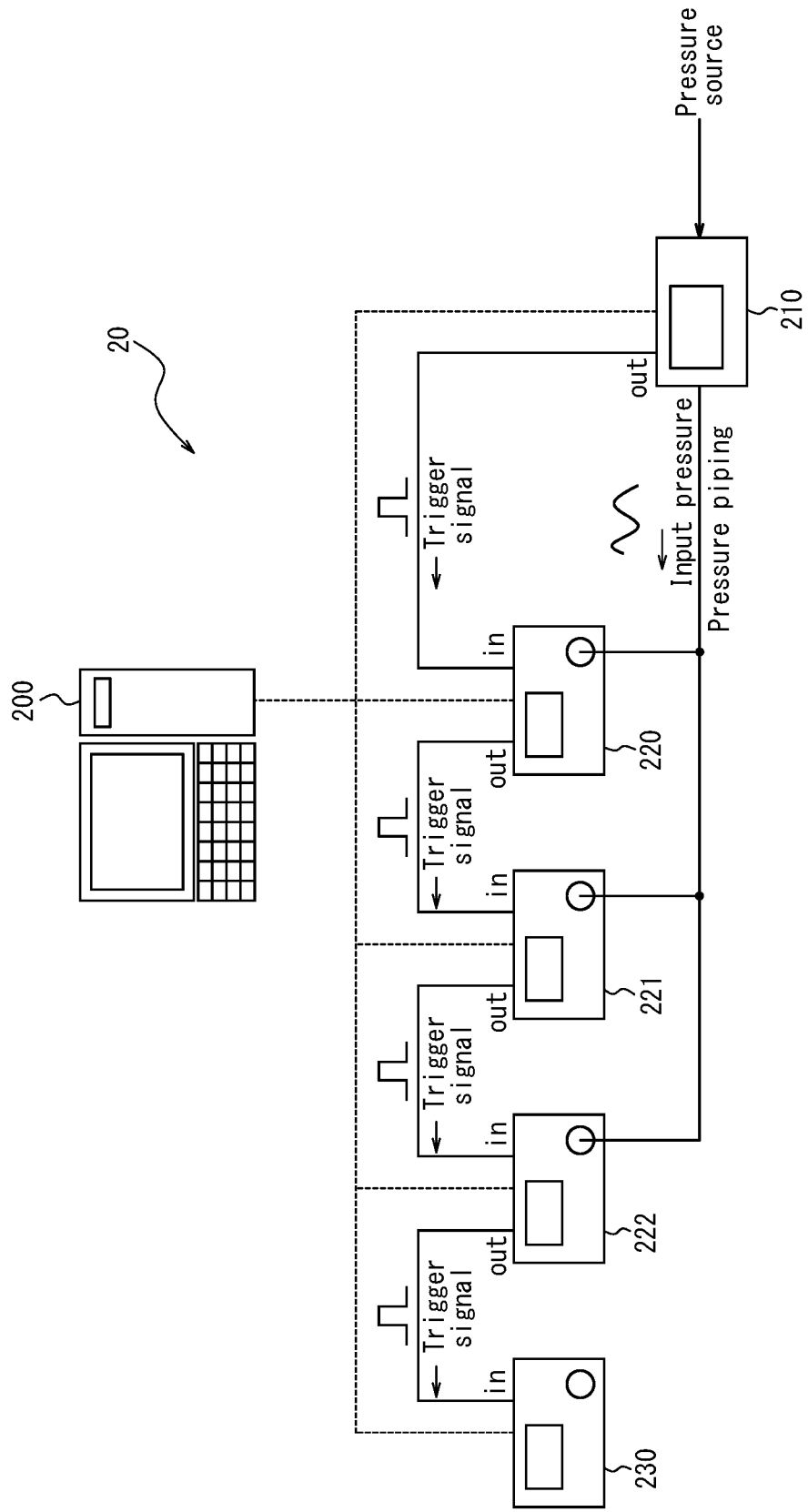
FIG. 4 is a schematic diagram illustrating an example measurement system according to an embodiment.

FIG. 4 is a schematic diagram illustrating an example measurement system 20 according to an embodiment. The measurement system 20 according to the present embodiment includes a control apparatus 200, a pressure control apparatus 210, three pressure measurement apparatuses 220, 221 and 222, and an atmospheric pressure gauge 230.

In the present embodiment, the pressure measurement apparatus 220 is a reference device used as a reference for inspection or calibration, and the other pressure measurement apparatuses 221 and 222 are apparatuses to be inspected or calibrated. Accordingly, in the present embodiment, the pressure measurement apparatus 220 is a reference device, and the pressure measurement apparatuses 221 and 222 are devices under test. When distinguishing between the two devices under test, the terms "first device under test 221" and "second device under test 222" are used. The three pressure measurement apparatuses 220, 221 and 222 may, for example, be configured as pressure transmitters, differential pressure transmitters, or the like.

In the measurement system 20 according to the present embodiment, pressure piping is connected to the reference device 220 and the devices under test 221 and 222, as indicated by the solid lines in FIG. 4. Fluid controlled by the pressure control apparatus 210 is supplied to the pressure piping. When inspection or calibration is performed in the measurement system 20, the reference device 220 and the devices under test 221 and 222 each measure the pressure of the fluid supplied to the pressure piping. The inspection or calibration is performed by comparing the results of pressure measurement by the reference device 220 and the devices under test 221 and 222. The number of devices under test in the measurement system 20 need not be two. The measurement system 20 may, for example, include one device under test or three or more devices under test.

In the measurement system 20 according to the present embodiment, the pressure control apparatus 210, the reference device 220, the first device under test 221, the second device under test 222, and the atmospheric pressure gauge 230 are connected in a daisy chain by a cable or the like, for example. The pressure control apparatus 210, the reference device 220, the first device under test 221, the second device under test 222, and the atmospheric pressure gauge 230 include an input terminal for receiving input of signals, an output terminal for outputting signals, or both an input terminal and an output terminal. That is, the pressure control apparatus 210, the reference device 220, the first device under test 221, the second device under test 222, and the atmospheric pressure gauge 230 output signals to the cable from the output terminal and receive input of signals, transmitted over the cable, from the input terminal. In the present embodiment, the below-described trigger signal is transmitted over the cable. The pressure control apparatus 210, the reference device 220, the first device under test 221, the second device under test 222, and the atmospheric pressure gauge 230 are not necessarily connected in a daisy chain using a cable. It suffices for the pressure control apparatus 210, the reference device 220, the first device under test 221, the second device under test 222, and the atmospheric pressure gauge 230 to be communicatively connected in a wired or wireless manner to allow reception of the trigger signal.

The pressure control apparatus 210 has a similar configuration and similar functions to those of the pressure control apparatus 110 described with reference to FIG. 1. For example, the pressure control apparatus 210 controls the fluid supplied to the pressure piping. The pressure control apparatus 210 according to the present embodiment also outputs a signal (trigger signal) designating a timing for measurement to the daisy-chained cable. In other words, the pressure control apparatus 210 in the present embodiment includes a trigger signal generator that generates a trigger signal.

The trigger signal outputted from the pressure control apparatus 210 is transmitted sequentially to the reference device 220, the first device under test 221, the second device under test 222, and the atmospheric pressure gauge 230 over the daisy-chained cable. Specifically, the trigger signal outputted from the output terminal of the pressure control apparatus 210 is input to the input terminal of the reference device 220 via the cable. After receiving input of the trigger signal, the reference device 220 outputs the trigger signal from the output terminal. The output signal is input to the input terminal of the first device under test 221 via the cable. In this way, the trigger signal is transmitted sequentially from the reference device 220 to the first device under test 221, the second device under test 222, and the atmospheric pressure gauge 230. The reference device 220, the first device under test 221, the second device under test 222, and the atmospheric pressure gauge 230 measure the pressure at the timing designated by the trigger signal. In other words, the timing of measurement of pressure by the reference device 220, the first device under test 221, the second device under test 222, and the atmospheric pressure gauge 230 can be synchronized by the trigger signal.

The trigger signal may, for example, designate the timing at which to start measurement of pressure. In this case, the reference device 220, the first device under test 221, the second device under test 222, and the atmospheric pressure gauge 230 start measuring the pressure at the timing designated by the trigger signal and subsequently measure the pressure over a predetermined sampling cycle. If the sampling cycles of the reference device 220, the first device under test 221, the second device under test 222, and the atmospheric pressure gauge 230 are equivalent, these devices can measure the pressure at the same timing.

The trigger signal may designate the timing at which to measure the pressure. In this case, the reference device 220, the first device under test 221, the second device under test 222, and the atmospheric pressure gauge 230 measure the pressure at the timing designated by the trigger signal. The pressure control apparatus 210 may, in this case, transmit the trigger signal over a predetermined sampling cycle. The timing of measurement can be synchronized in this case even if the reference device 220, the first device under test 221, the second device under test 222, and the atmospheric pressure gauge 230 individually have different sampling cycles.

When measurement of the pressure is complete, the reference device 220, the first device under test 221, the second device under test 222, and the atmospheric pressure gauge 230 temporarily store the measurement result in a memory provided in each device.

The control apparatus 200 has a similar configuration and similar functions to those of the control apparatus 100 described with reference to FIG. 1. A detailed description is therefore omitted. Furthermore, apart from transmitting and receiving the above-described trigger signal and performing measurement on the basis of the trigger signal, the reference device 220, the first device under test 221, the second device under test 222, and the atmospheric pressure gauge 230 are similar to the reference device 120, the first device under test 121, the second device under test 122, and the atmospheric pressure gauge 130 described with reference to FIG. 1. A detailed description is therefore omitted.

In the measurement system 20 according to the present embodiment, a trigger signal designating a timing for measurement is outputted from the pressure control apparatus 210, and the reference device 220, the first device under test 221, the second device under test 222, and the atmospheric pressure gauge 230 measure the pressure at the timing designated by the trigger signal. Consequently, the reference device 220, the first device under test 221, the second device under test 222, and the atmospheric pressure gauge 230 measure the pressure at the same timing. As described with reference to FIG. 3, the results of pressure measurement by these devices are therefore less susceptible to the effect of a difference in the pressure of the fluid depending on the timing of pressure measurement, even when the pressure of the fluid input to the pressure piping is unstable. The measurement system 20 according to the present embodiment can therefore perform inspection or calibration more accurately than the measurement system 10 described with reference to FIG. 1.

Since the measurement system 20 according to the present embodiment can perform inspection or calibration more accurately even when the pressure of the fluid input to the pressure piping is unstable, the conditions on the surrounding environment when performing inspection or calibration processing can be relaxed as compared to the measurement system 10 described with reference to FIG. 1. The required range of the surrounding temperature, for example, is wider in the measurement system 20 according to the present embodiment than in the measurement system 10. The air conditioning equipment for performing inspection or calibration processing can therefore become unnecessary, or the conditions on operation can be relaxed when air conditioning equipment is used in the measurement system 20. Consequently, investment in equipment can be reduced with the measurement system 20 according to the present embodiment. The measurement system 20 according to the present embodiment can also perform inspection or calibration without having to wait until the pressure of the fluid inside the pressure piping stabilizes.

In the measurement system 20 according to the present embodiment, the trigger signal is also supplied to the atmospheric pressure gauge 230, and the measurement timing is synchronized. The timing of the atmospheric pressure measurement by the atmospheric pressure gauge 230 can therefore be synchronized with the timing of gauge pressure measurement by the reference device 220, the first device under test 221, and the second device under test 222.

The trigger signal is generated in the pressure control apparatus 210 in the present embodiment. The timing of pressure measurement can therefore be synchronized without need for an external trigger signal generator for generating the trigger signal.

In the above embodiment, an example of the pressure control apparatus 210 generating the trigger signal has been described. The trigger signal does not, however, need to be generated by the pressure control apparatus 210. For example, the trigger signal may be generated by any one of the reference device 220, the first device under test 221, the second device under test 222, and the atmospheric pressure gauge 230, and transmitted to the other devices. The trigger signal may be generated by any apparatus capable of supplying the trigger signal to the devices for which timing of pressure measurement is to be synchronized (in the example in FIG. 4, the reference device 220, the first device under test 221, the second device under test 222, and the atmospheric pressure gauge 230). Even when the trigger signal is supplied from such an apparatus, the reference device 220, the first device under test 221, the second device under test 222, and the atmospheric pressure gauge 230 can measure the pressure at the same timing. Measurement is therefore less susceptible to the effect of a difference in the pressure of the fluid depending on the timing of pressure measurement, and inspection or calibration can be performed more accurately. Furthermore, when the trigger signal is generated by a device included in the measurement system 20 (for example, one of the reference device 220, the first device under test 221, the second device under test 222, and the atmospheric pressure gauge 230), the measurement system 20 can synchronize the measurement timing without using an external apparatus as the supply source of the trigger signal.

For example, the trigger signal may be generated by an apparatus external to the measurement system 20 illustrated in FIG. 4 and supplied to the reference device 220, the devices under test 221 and 222, and the atmospheric pressure gauge 230. Supply of the trigger signal from an external apparatus allows the measurement timing to be synchronized without placing the load for processing to generate the trigger signal on any of the devices included in the measurement system 20 (for example, any of the reference device 220, the first device under test 221, the second device under test 222, and the atmospheric pressure gauge 230).

The trigger signal may, for example, be generated by the control apparatus 200 and supplied to the reference device 220, the devices under test 221 and 222, and the atmospheric pressure gauge 230. Furthermore, the trigger signal may be generated by the reference device 220, the device under test 221 or 222, or the atmospheric pressure gauge 230.

Figure 5:
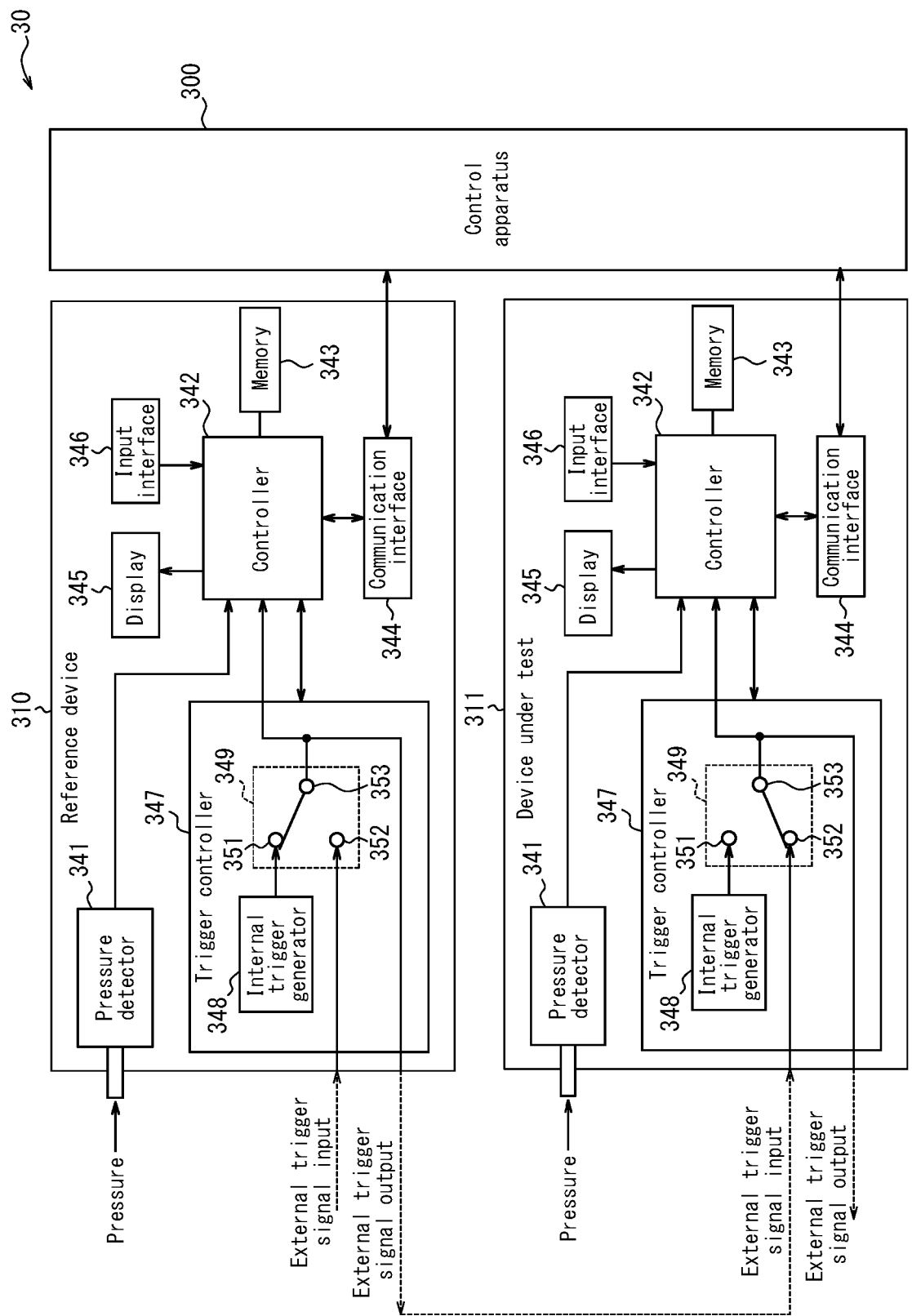
FIG. 5 is a functional block diagram of a modification to the measurement system.

FIG. 5 is a functional block diagram of a modification to the measurement system. FIG. 5 shows a control apparatus 300, a reference device 310, and a device under test 311 included in a measurement system 30. Other constituent devices, such as a pressure control apparatus and an atmospheric pressure gauge, are omitted from the drawing. In FIG. 5, functional blocks are only depicted for the reference device 310 and the device under test 311. In the measurement system 30 illustrated in FIG. 5, the reference device 310 or the device under test 311 is configured to be capable of generating a trigger signal.

The reference device 310 and the device under test 311 may be configured to have the same functional blocks, as illustrated in FIG. 5. The functional blocks of the reference device 310 are described here, whereas a description of the functional blocks of the device under test 311 is omitted.

The reference device 310 includes a pressure detector 341, a controller 342, a memory 343, a communication interface 344, a display 345, an input interface 346, and a trigger controller 347. The pressure detector 341, the controller 342, the memory 343, the communication interface 344, the display 345, and the input interface 346 respectively have similar configurations and similar functions to those of the pressure detector 141, the controller 142, the memory 143, the communication interface 144, the display 145, and the input interface 146 described with reference to FIG. 2. A detailed description is therefore omitted.

The trigger controller 347 manages generation and transmission of the trigger signal. The trigger controller 347 is connected to a trigger signal input terminal and output terminal. Accordingly, when the reference device 310 receives input of a trigger signal from the input terminal, the trigger signal is input to the trigger controller 347. Also, a trigger signal is outputted to the output terminal from the trigger controller 347. The trigger controller 347 includes an internal trigger generator 348 and a trigger input switching unit 349.

The internal trigger generator 348 generates a trigger signal. For example, the internal trigger generator 348 generates the trigger signal over a predetermined cycle.

The trigger input switching unit 349 is formed by a switching apparatus that switches the input source of the trigger signal. The trigger input switching unit 349 includes a first input unit 351, a second input unit 352, and an output unit 353. The first input unit 351 is connected to the internal trigger generator 348. The second input unit 352 is connected to an input terminal for the reference device 310 to receive input of the trigger signal from an external apparatus. The output unit 353 is connected to an output terminal for outputting the trigger signal.

The trigger input switching unit 349 switches the input source of the trigger signal between the internal trigger generator 348 and the external apparatus by selectively switching between the first input unit 351 and the second input unit 352. The switching is made on the basis of a control signal from the controller 342, for example. When the first input unit 351 is selected by the trigger input switching unit 349 of the reference device 310, the reference device 310 functions as the source that generates the trigger signal in the measurement system 30. In this case, the trigger signal generated by the internal trigger generator 348 of the reference device 310 is supplied to the controller 342, and the controller 342 measures the pressure at the timing designated by the trigger signal. Furthermore, the trigger signal generated by the internal trigger generator 348 of the reference device 310 is outputted to an external destination from the output terminal via the output unit 353. For example, when the second input unit 352 is selected in the trigger input switching unit 349 of the device under test 311 as illustrated in FIG. 5, the device under test 311 receives input of the trigger signal generated and outputted by the reference device 310. The device under test 311 measures the pressure at the timing designated by the trigger signal of which input was received. The device under test 311 can output this trigger signal to an external destination from the output terminal via the output unit 353.

In this way, the reference device 310 and the device under test 311 can perform switching between the first input unit 351 and the second input unit 352 in the trigger input switching unit 349 and can thereby switch the input source of the trigger signal between an internal and an external source. Furthermore, such switching that uses the reference device 310 and the device under test 311, which each include the trigger controller 347, allows the input source of the trigger signal to be switched easily.

Figure 6:
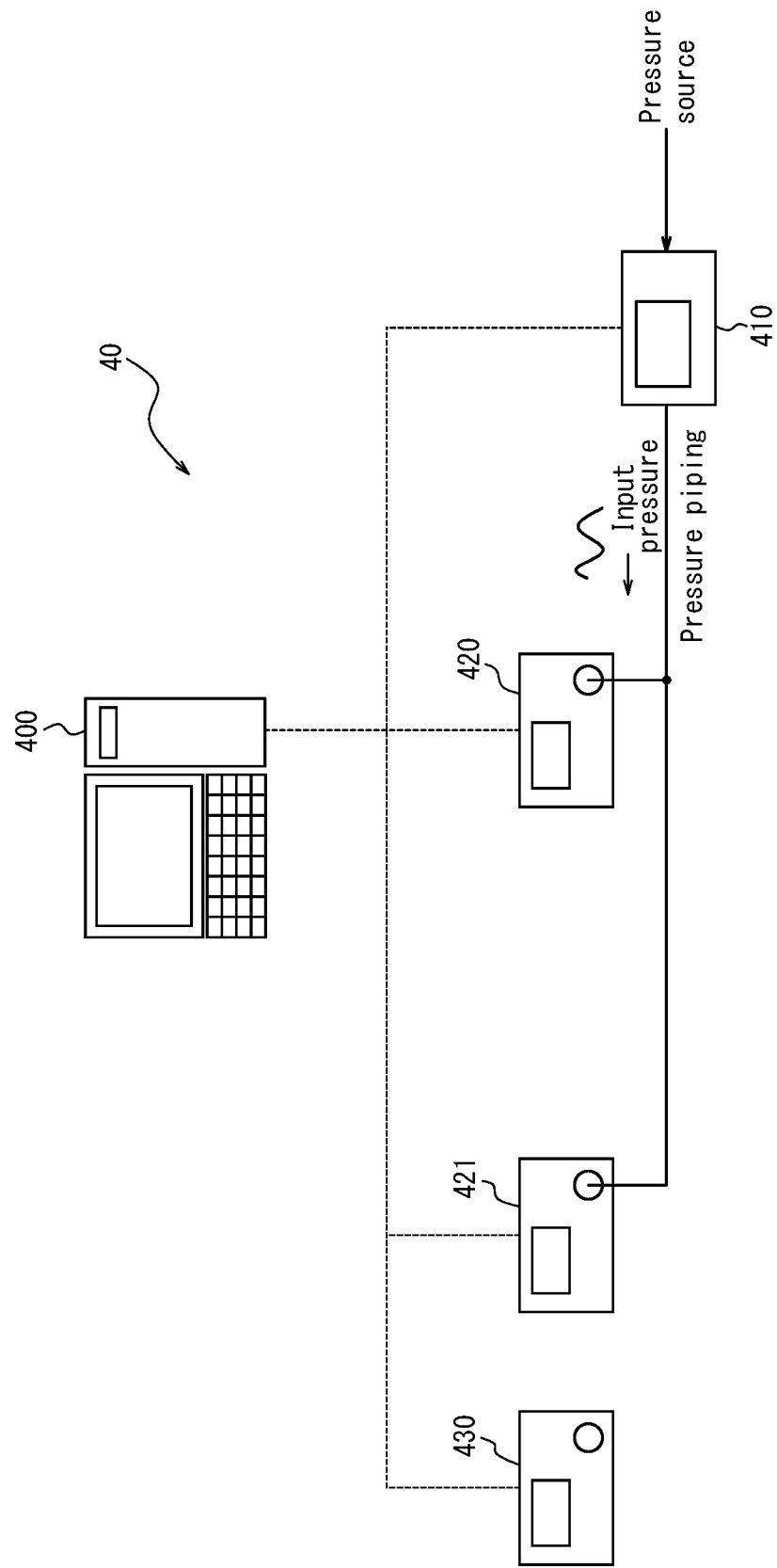
FIG. 6 is a schematic diagram illustrating an example measurement system used in an experiment.

The effects of the measurement system according to the present disclosure have been verified by performing two experiments. FIG. 6 is a schematic diagram illustrating a measurement system 40 used in the experiments. The measurement system 40 includes a control apparatus 400, a pressure control apparatus 410, a reference device 420, a device under test 421, and an atmospheric pressure gauge 430. The control apparatus 400, the pressure control apparatus 410, the reference device 420, the device under test 421, and the atmospheric pressure gauge 430 respectively have similar configurations and similar functions to those of the control apparatus 200, the pressure control apparatus 210, the reference device 220, the first device under test 221, and the atmospheric pressure gauge 230 described with reference to FIG. 4. A detailed description is therefore omitted. In the experiments, the reference device 420, the device under test 421, and the atmospheric pressure gauge 430 are based on the "MT210" digital pressure gauge produced by Yokogawa Electric Corporation of Tokyo, Japan, adapted to incorporate measurement of pressure at a measurement timing designated by a trigger signal in the manner discussed above with reference to FIG. 1 to FIG. 5.

In the first experiment, a flow of 1 kPa was supplied to the pressure piping by the pressure control apparatus 410. In the first experiment, the difference in the pressure measured by the reference device 420 and the device under test 421, in the measurement system 40 illustrated in FIG. 6, was verified for a case in which the trigger signal is used and a case in which the a trigger signal is not used.

Figure 7:
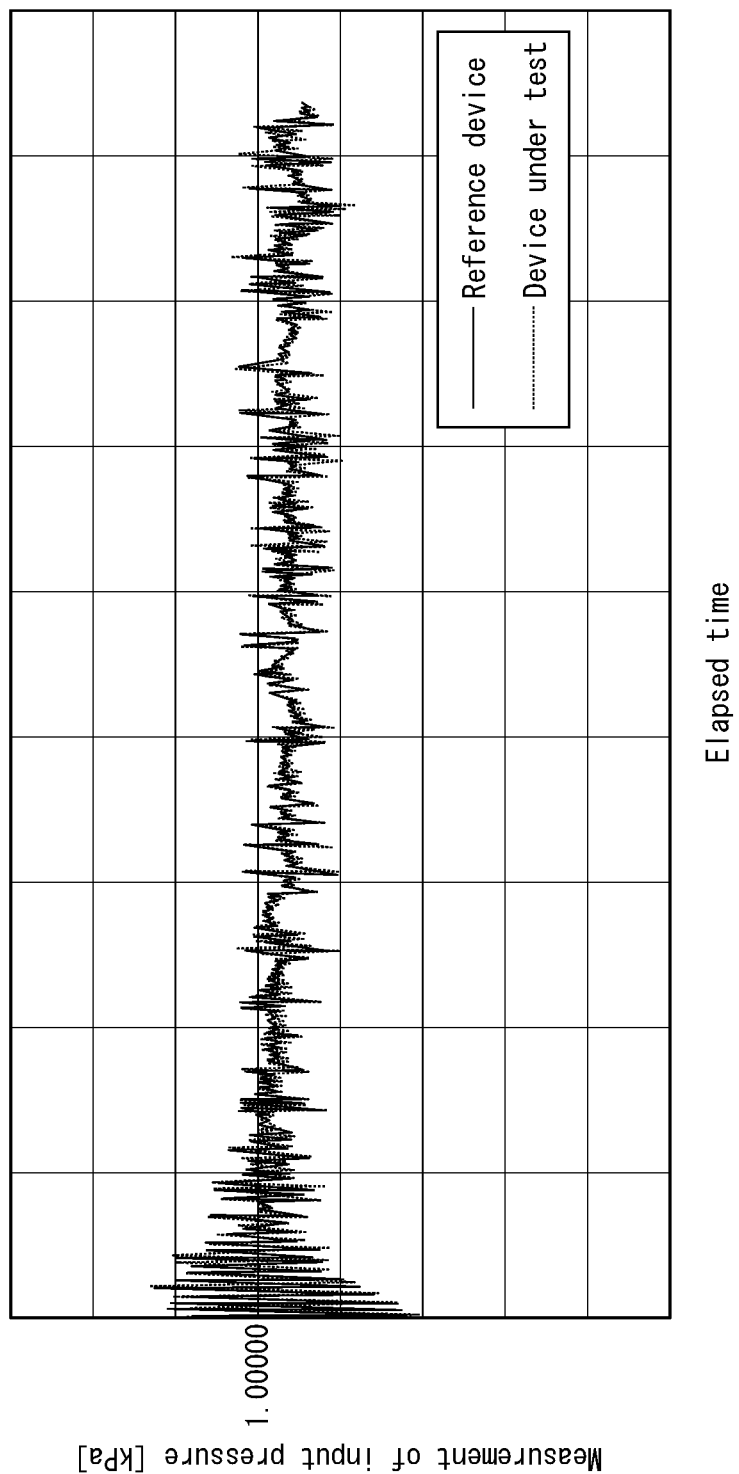
FIG. 7 illustrates measurement values of input pressure by a reference device and a device under test when not using a trigger signal in a first experiment.
Figure 8:
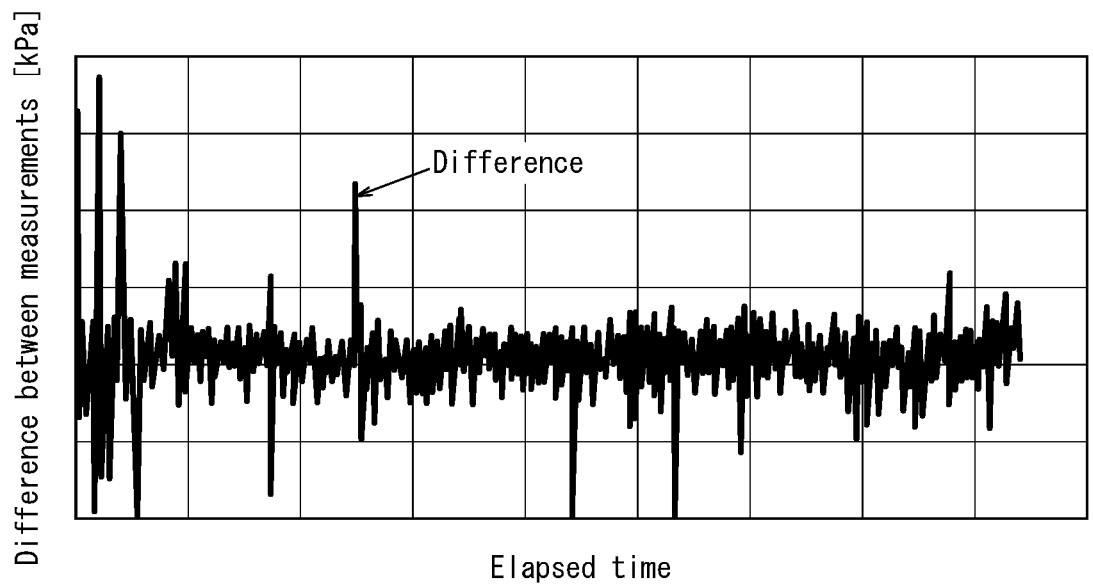
FIG. 8 illustrates the difference between the measurement values of the reference device and the device under test in FIG. 7.

FIG. 7 illustrates the measurements of input pressure of the pressure piping by the reference device 420 and the device under test 421 in the case in which a trigger signal is not used in the first experiment. FIG. 8 illustrates the difference between the measurements by the reference device 420 and the device under test 421 in FIG. 7. When a trigger signal is not used, the timings of measurement of pressure by the reference device 420 and the device under test 421 may be misaligned. In this case, the difference in the measurements of the reference device 420 and the device under test 421 may shift significantly, as can be seen in FIG. 8.

Figure 9:
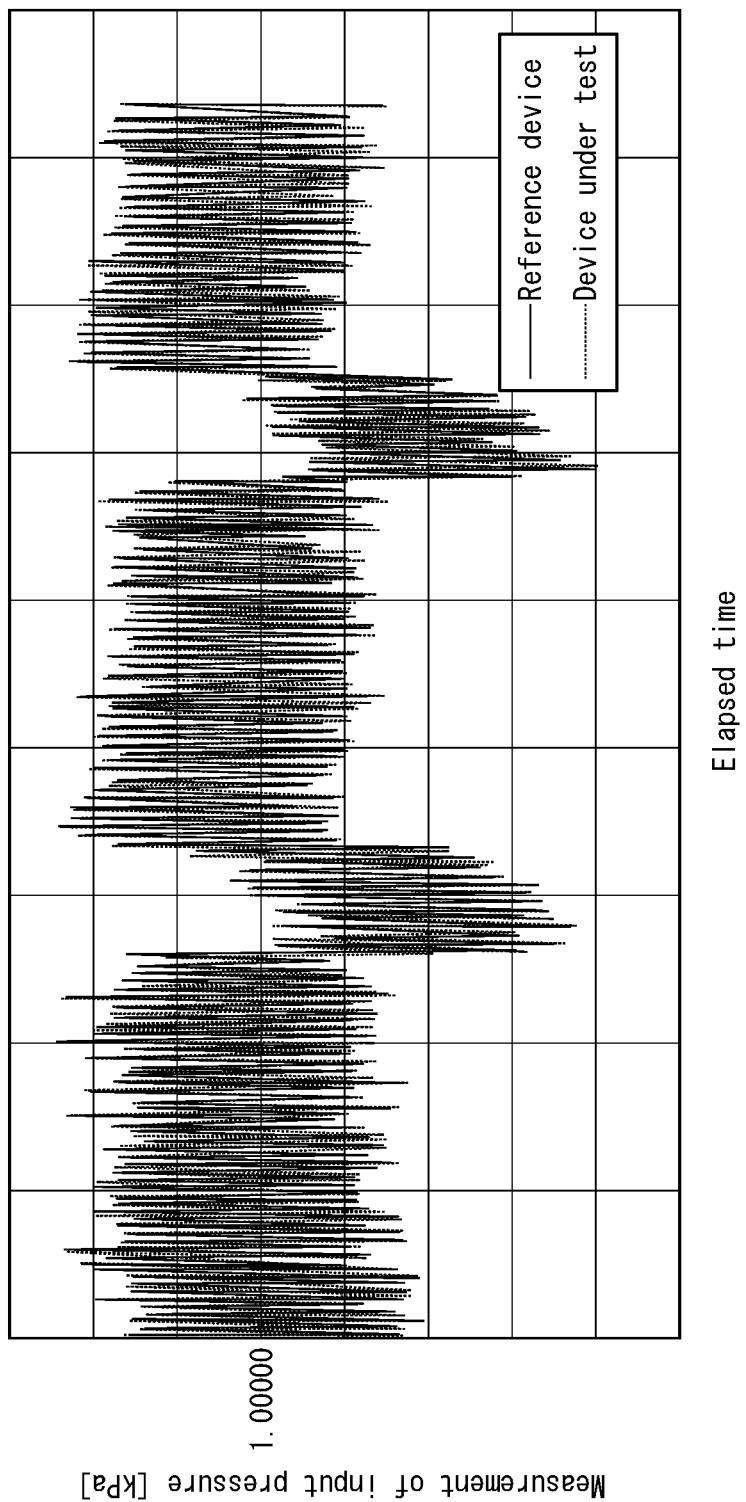
FIG. 9 illustrates the measurement values of input pressure by the reference device and the device under test when using a trigger signal in the first experiment.
Figure 10:
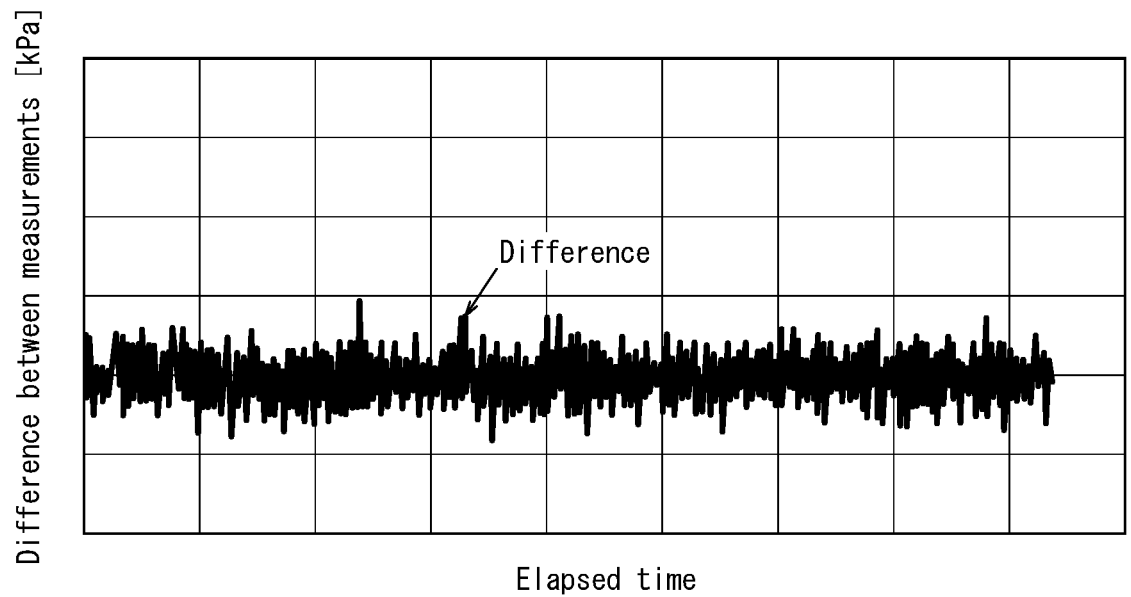
FIG. 10 illustrates the difference between the measurement values of the reference device and the device under test in FIG. 9.

FIG. 9 illustrates the measurements of input pressure of the pressure piping by the reference device 420 and the device under test 421 in the case in which a trigger signal is used in the first experiment. FIG. 10 illustrates the difference between the measurements by the reference device 420 and the device under test 421 in FIG. 9. When a trigger signal is used, the timing of the measurement of pressure by the reference device 420 and the device under test 421 is synchronized. In this case, the difference in the measurements of the reference device 420 and the device under test 421 falls within a certain range, as can be seen in FIG. 10. In particular, referring to FIG. 9, even when the pressure of the fluid supplied to the pressure piping becomes unstable and the value of pressure detected by the reference device 420 and the device under test 421 fluctuates, the difference in the measurements of the reference device 420 and the device under test 421 was confirmed to fall within a predetermined range, as illustrated in FIG. 10. Use of the trigger signal to synchronize the timing of measurement of pressure between the reference device 420 and the device under test 421 can thus be considered to enable a comparison of the difference (instrumental error) of each measurement device within a certain range.

In the second experiment, the pressure of the fluid supplied to the pressure piping by the pressure control apparatus 410 was set to change from 0 kPa to 130 kPa. Fluctuation in the input of pressure was thus generated in a pseudo manner. In the second experiment, the difference in the pressure measured by the reference device 420 and the device under test 421, in the measurement system 40 illustrated in FIG. 6, was verified for a case in which the trigger signal is used and a case in which a trigger signal is not used.

Figure 11:
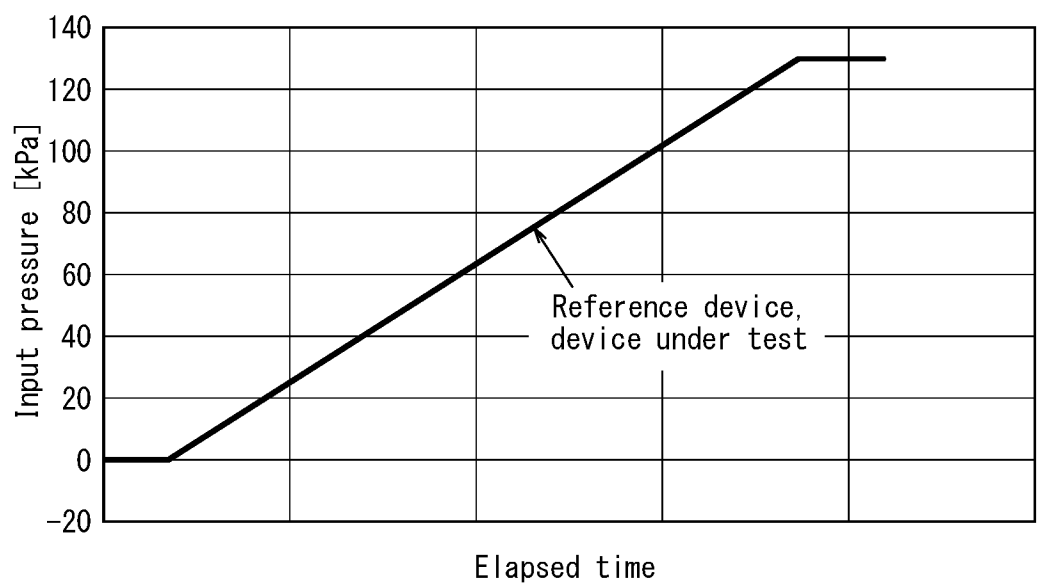
FIG. 11 illustrates the change in the input pressure of a fluid supplied to pressure piping in a second experiment.

FIG. 11 illustrates the change in the input pressure of a fluid supplied to the pressure piping in the second experiment. As illustrated in FIG. 11, the pressure of the fluid supplied to the pressure piping was set to change from 0 kPa to 130 kPa. In the second experiment, an input condition of 130 kPa/100 s was used.

Figure 12:
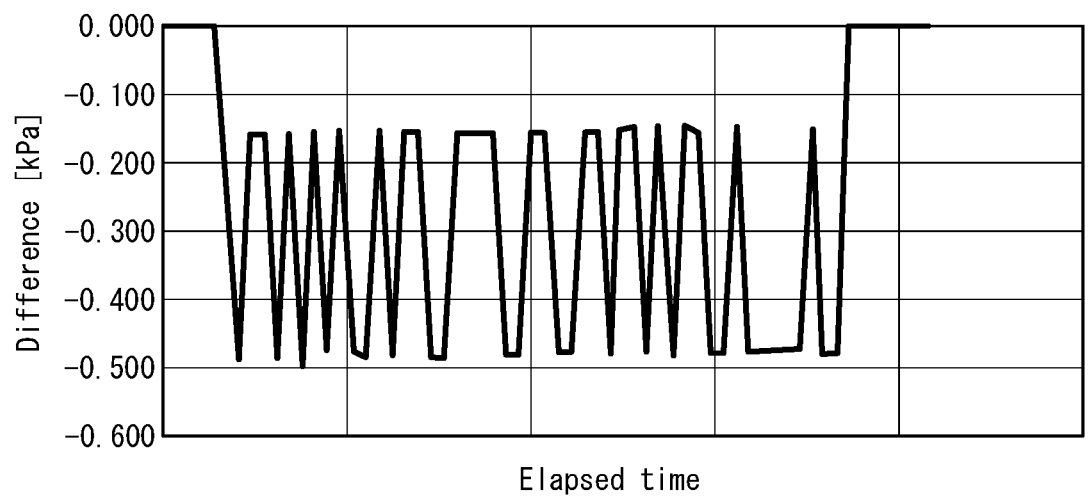
FIG. 12 illustrates the difference between the measurement values of a reference device and a device under test when not using a trigger signal in the second experiment.

FIG. 12 illustrates the difference in measurements of input pressure of the pressure piping by the reference device 420 and the device under test 421 in the case in which a trigger signal is not used in the second experiment. When a trigger signal is not used, the difference in the measurements of the reference device 420 and the device under test 421 may shift significantly, as can be seen in FIG. 12.

Figure 13:
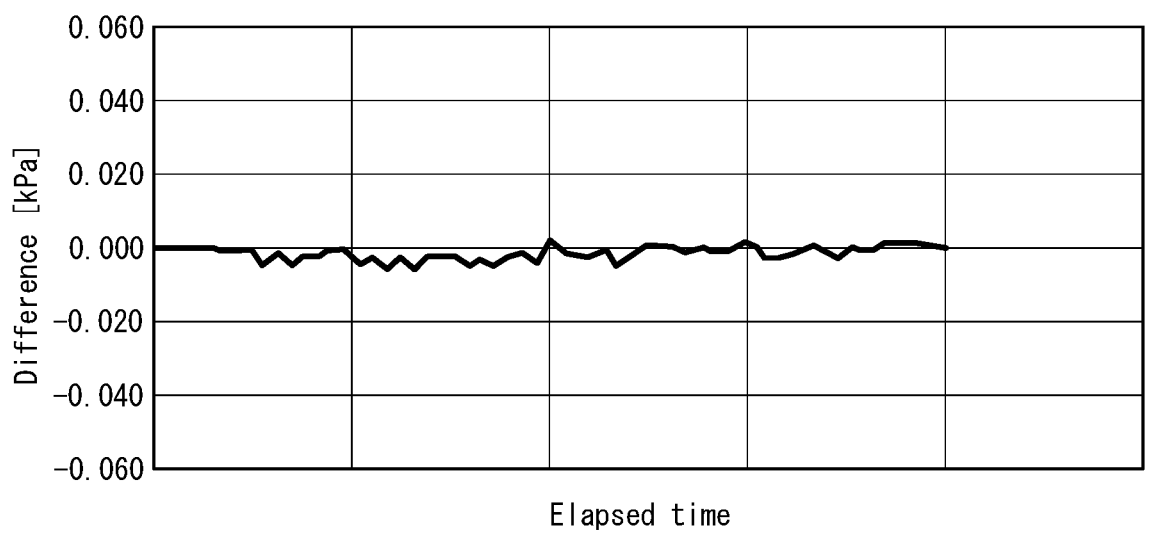
FIG. 13 illustrates the difference between the measurement values of the reference device and the device under test when using a trigger signal in the second experiment.

FIG. 13 illustrates the difference in measurements of input pressure of the pressure piping by the reference device 420 and the device under test 421 in the case in which a trigger signal is used in the second experiment. When a trigger signal is used to synchronize the timing of measurement of pressure, the difference in the measurements of the reference device 420 and the device under test 421 falls within a certain range, as can be seen in FIG. 13. In contrast with FIG. 12, it is clear that the range of the difference in the measurements by the reference device 420 and the device under test 421 when a trigger signal is used becomes extremely small as compared to when a trigger signal is not used. In this way, even when the input pressure fluctuates, synchronization of the measurement timing can be considered to improve the accuracy of measurement or calibration.

Figure 14:
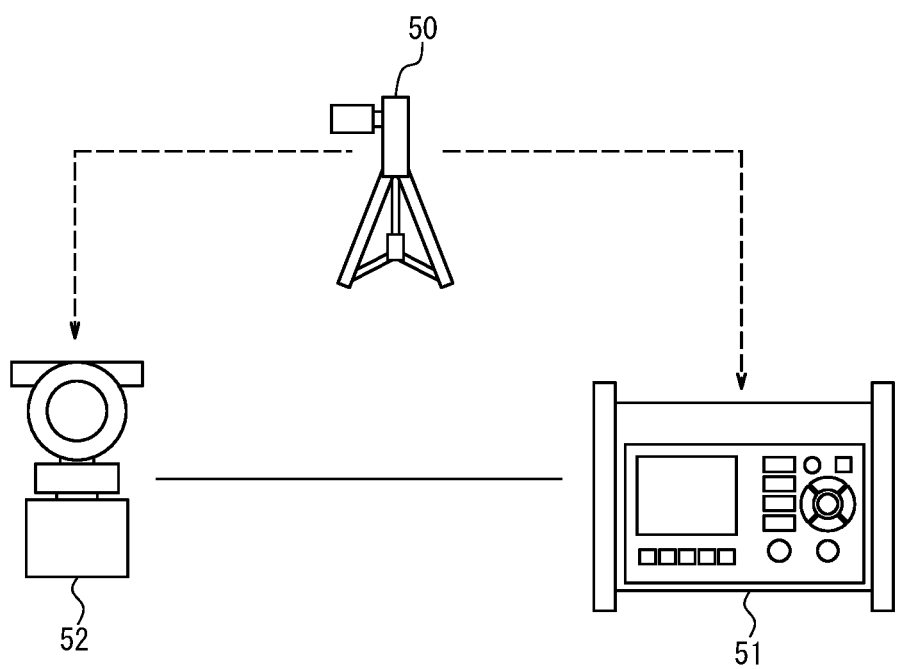
FIG. 14 schematically illustrates application of a measurement system to field calibration.

The measurement system according to the above embodiment can also be adapted to field calibration performed at the site where a device under test is installed. For example, field calibration of a differential pressure transmitter and/or a pressure transmitter can be performed outdoors. In this case, the worker or the like who performs the calibration carries a hand pump 50 and a pressure calibrator 51 (i.e., reference device) to the location where a pressure/differential pressure transmitter 52 (i.e., device under test) is installed, as illustrated schematically in FIG. 14, for example. The pressure calibrator 51 connects to pressure piping, to which the pressure/differential pressure transmitter 52 is connected, to be capable of receiving input of the pressure of the pressure piping. The pressure calibrator 51 and the pressure/differential pressure transmitter 52 are communicably connected to each other. Pressure is applied by the hand pump 50 to the fluid in the pressure piping to which the pressure calibrator 51 and the pressure/differential pressure transmitter 52 are connected. The pressure calibrator 51 and the pressure/differential pressure transmitter 52 each measure the pressure. At this time, the pressure calibrator 51 and the pressure/differential pressure transmitter 52 measure the pressure at the timing designated by a trigger signal. The trigger signal is, for example, generated by the pressure calibrator 51 and outputted to the pressure/differential pressure transmitter 52. An electric signal related to the pressure measured by the pressure/differential pressure transmitter 52 is transmitted to the pressure calibrator 51, for example. Calibration is performed by comparing the values of the pressure measured by the pressure calibrator 51 and the pressure/differential pressure transmitter 52.

Here, the fluid inside the pressure piping may be affected by the surrounding temperature and fluctuate gradually during the field calibration. Even in an environment in which the input pressure may fluctuate, however, the application of the measurement system according to the present embodiment can improve the calibration accuracy by synchronizing the measurement timing.

Figure 15:
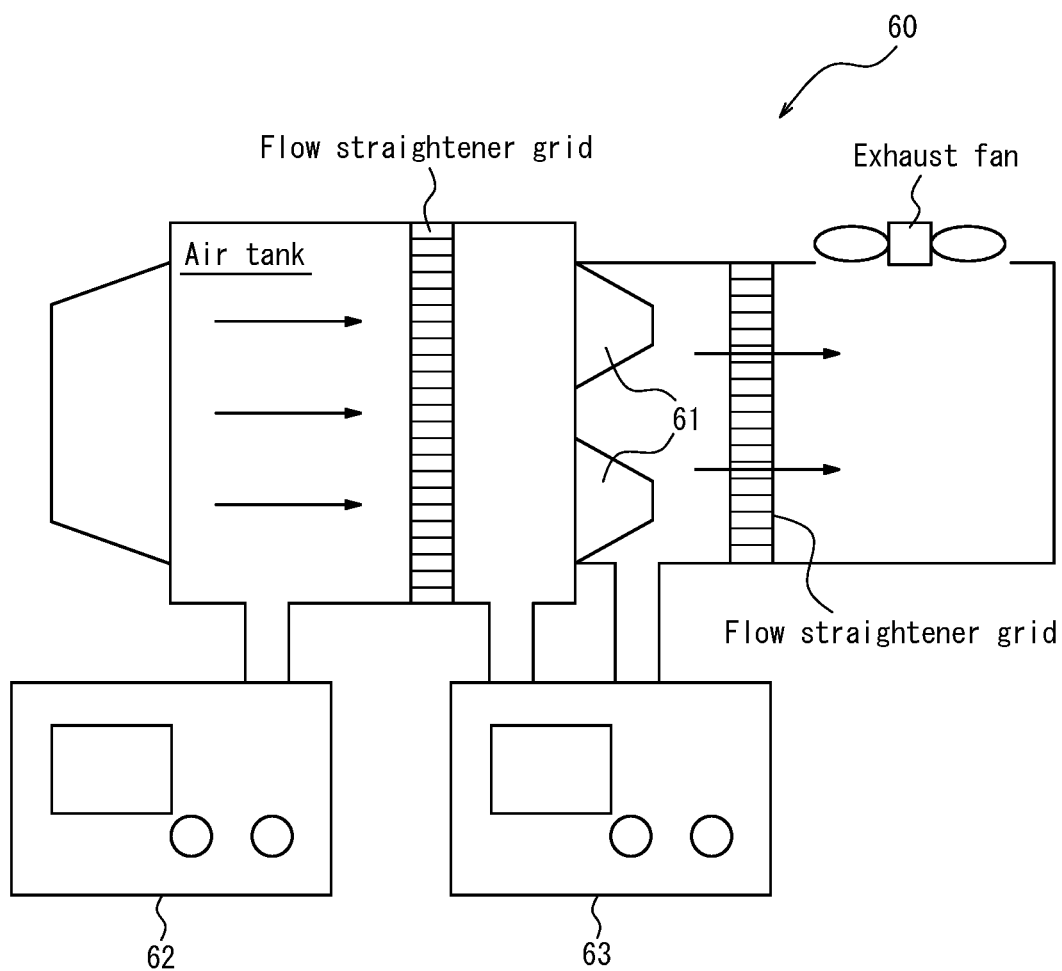
FIG. 15 illustrates a response example of a measurement system.

The measurement system according to the above embodiment can, for example, also be applied to other measurements apart from pressure. The above-described measurement system can be used when synchronizing the measurement timing of a plurality of measurement devices. For example, the above-described measurement system can be applied to a flow rate measurement system. As schematically illustrated in FIG. 15, for example, the differential pressure across an airflow measurement nozzle 61 may be measured in a test of the cooling and heating capability of an air conditioner 60. To measure the differential pressure, the gauge pressure inside the air conditioner 60 is measured by a first measurement device 62 on the upstream side of the airflow measurement nozzle 61, and the differential pressure inside the air conditioner 60 is measured by a second measurement device 63 on the downstream side of the airflow measurement nozzle 61. During the test of the cooling and heating capability of the air conditioner 60, the timing of measurement by the first measurement device 62 and the second measurement device 63 can be synchronized by applying the above-described measurement system and using a trigger signal.

Embodiments of the present disclosure have been described with reference to the drawings, but the present disclosure is not limited to these embodiments, and a variety of modifications may be made without departing from the spirit and scope thereof.

The invention claimed is:

1. A measurement system comprising:
a pressure control apparatus capable of outputting an external trigger signal;
a plurality of pressure measurement apparatuses capable of measuring pressure; and
an atmospheric pressure gauge capable of measuring atmospheric pressure,
wherein the plurality of pressure measurement apparatuses and the atmospheric pressure gauge each comprise an internal trigger generator configured to generate an internal trigger signal and a trigger input switching unit configured to select one of the external and internal trigger signals,
the plurality of pressure measurement apparatuses measures the pressure at a measurement timing designated by the selected one of the external and internal trigger signals, the atmospheric pressure gauge measures the atmospheric pressure at the measurement timing designated by the selected one of the external and internal trigger signals, and
the atmospheric pressure measured by the atmospheric pressure gauge is used as a reference pressure when the measured pressure is calculated in the plurality of pressure measurement apparatuses.

2. The measurement system of claim 1, wherein the trigger signal is generated by one pressure measurement apparatus among the plurality of pressure measurement apparatuses.

3. The measurement system of claim 1, wherein the plurality of pressure measurement apparatuses is connected in a daisy chain.

4. A measurement method executed by a measurement system comprising a pressure control apparatus configured to output an external trigger signal, a plurality of pressure measurement apparatuses capable of measuring pressure, and an atmospheric pressure gauge capable of measuring atmospheric pressure, the pressure measurement apparatuses and the atmospheric pressure gauge each comprising an internal trigger generator configured to generate an internal trigger signal and a trigger input switching unit, the measurement method comprising:
receiving, using the plurality of pressure measurement apparatuses and the atmospheric pressure gauge, the external trigger signal;
selecting, using the trigger input switching unit, one of the external and interna trigger signals;
measuring the pressure, using the plurality of pressure measurement apparatuses, at a measurement timing designated by the selected one of the external and internal trigger signals, and
measuring the atmospheric pressure, using the atmospheric pressure gauge, at the measurement timing designated by the selected one of the external and internal trigger signals, wherein
the atmospheric pressure measured by the atmospheric pressure gauge is used as a reference pressure when the measured pressure is calculated in the plurality of pressure measurement apparatuses.

5. A pressure measurement apparatus comprising:
an internal trigger generator configured to generate an internal trigger signal;
a trigger input switching unit configured to select one of an external trigger signal from an external apparatus and the internal trigger signal; and
a controller configured to execute pressure measurement processing at a measurement timing designated by the selected one of the external and internal trigger signals, wherein
an atmospheric pressure measured by an atmospheric pressure gauge at the measurement timing designated by the selected one of the external and internal trigger signals is used as a reference pressure when the measured pressure is calculated.

\* \* \* \* \*